3,330,738
PRODUCTION OF ENZYME COMPLEX BY CYTOPHAGA (FLAVOBACTERIUM) NCIB 9497

Eunice J. Napier, Mattingley, England, assignor to Glaxo Laboratories Limited, Greenford, England, a British company
No Drawing. Filed May 21, 1965, Ser. No. 457,821
Claims priority, application Great Britain, May 26, 1964, 21,770/64
17 Claims. (Cl. 195—66)

This invention is concerned with a method for the production of a novel enzyme system.

Enzyme preparations are finding increasing use in industry for various purposes. For example proteolytic enzymes find numerous uses, e.g., in the baking, tanning and brewing industries.

A bacterium has now been discovered which produces an enzyme complex having particularly valuable properties, including a broad spectrum of action coupled with rapid action. In particular the enzyme complex lyses fungal mycelium, has strong proteolytic activity including action on keratin, and contains inter alia laminarinase and chitinase, which makes it useful for a wide variety of purposes.

The organism which has been isolated and which produces the new enzyme complex has been temporarily designated L1 and is a species of the genus Cytophaga. The organism L1 has been deposited in the National Collection of Industrial Bacteria at Aberdeen, Scotland, under the number NCIB 9497. The organism will hereinafter be designated Cytophaga NCIB 9497.

The following is an account of the properties of the organism Cytophaga NCIB 9497.

Morphology

Observed using a phase contrast microscope with a ×20 objective after culture in Nutrient broth for 24 hours at 20° C.

Non-motile short straight rods, fairly slender, sides parallel, ends rounded, singles and in pairs. Appearance similar in peptone water and also at 30° C.

Gram stain, from Nutrient agar 3 days at 20° C.:
Gram-negative, short straight rods, sides parallel, ends rounded; staining has an uneven banded appearance.
Similar appearance on Glucose peptone agar,
Staining even on Blood agar.

Colony appearance

Nutrient agar, 4 days at 20° C.:
Pale yellow, translucent, circular, convex, entire, smooth, shiny.
1.0–1.5 mm. diameter, pungent odour.

Glucose peptone agar, 4 days at 20° C.:
Pale yellow, translucent, circular, convex, entire, smooth, shiny, mucoid. 1.0–2.5 mm. diameter, pungent odour.

Blood agar, 4 days at 20° C.:
Greyish-yellow, translucent, circular, convex, entire, smooth, shiny.
1.0–2.0 mm. diameter. Pungent odour, no haemolysis.

Growth in fluid medium

Nutrient broth, 2 days at 20° C.:
Poor growth, very slight uniform turbidity, small viscid deposit.
Poor growth also at 30° C.

Peptone water 2 days at 20° C. and 30° C.:
Poor growth, very slight uniform turbidity.

Glucose peptone water, 2 days at 20° C. and 30° C.:
Moderate growth, slight uniform turbidity.

Temperature growth relationships

No growth at 5° C. or 10° C. Scant growth at 37° C.
Insensitive to penicillin and streptomycin. Sensitive to chloramphenicol and hydroxytetracycline.
No acid or gas from glucose, sucrose, maltose mannitol or starch at 20° C. or 30° C. No reaction in glucose Hugh & Leifson's medium.
Litmus milk peptonised and indicator reduced at 20° C., peptonised at 30° C.
Gelatin liquefied at 20° C.
Kovac's oxidase positive at 20° C. and 30° C.
Indole not produced, methyl red negative, acetylmethylcarbinol not produced, nitrate not reduced at 20° C. and 30° C. Ammonia produced from peptone at 20° C.. and 30° C. Catalase negative, urease negative at 20° C. and 30° C. Citrate utilised as sole carbon source at 20° C. and 30° C.
No lipase or lecithinase demonstrated on Egg yolk agar at 20° C. or 30° C.

These diagnostic reactions conducted according to Bergey's Manual of Determinative Bacteriology, 7th edition, 1957 (Bailliere Tindall & Cox, London) place the microorganism in the Flavobacteria (pp. 309–322) or Cytophaga (pp. 858–863). The Flavobacteria and the Cytophaga are now classified together as Cytophaga.

According to the present invention, there is provided a method of producing an enzyme complex which comprises culturing the micro-organism Cytophaga NCIB 9497 on or in a nutrient medium therefor under aerobic conditions.

The culture may be carried out by methods well-known in the fermentation industry preferably by submerged aerobic fermentation.

A wide variety of media may be used of types commonly used in the culture of micro-organisms. Such media essentially comprise a source of nitrogen, supplemented as necessary by carbohydrate and/or nutrient salts. Among the sources of nitrogen which have proved satisfactory are malt extract, meat extract, peptone and corn steep liquor alone or in admixture with one another. Particularly useful nitrogen sources however include fungal mycelium, such as mycelium of the genera Cephalosporium and Penicillium. It is thus possible to use as a nitrogen source waste mycelial residues from the production of antibiotics, which represent a comparatively cheap source of material.

As will be appreciated the nitrogen source may frequently supply the carbon and/or nutrient salts requirements of the organism Cytophaga NCIB 9497 without supplementation, and for example the organism will grow satisfactorily on a medium composed only of meat extract and peptone also containing sodium chloride. Supplementation by carbohydrate may however be required in some cases, suitable carbohydrates for this purpose including sucrose, maltose, glucose, etc. Trace minerals which may be required include magnesium, iron and zinc. The pH of the medium before sterilisation is conveniently between 5.0 and 8.0, preferably between 5.5 and 6.0.

The culture is conducted at a temperature between 20 and 35° C. and preferably between 22 and 32° C., a temperature of around 26° C. being about the optimum. Convenient culture times are from 20 to 50 hours.

The resulting culture liquid can be used as such for its enzymatic action or alternatively the enzyme complex may be recovered. Such recovery may simply take the form of drying the whole culture broth, or alternatively the broth may be clarified, e.g. by centrifugation and the clarified liquid dried e.g. by freeze-drying. Some purification of the enzyme complex may if desired be carried out, e.g. by methods commonly used in enzyme technology such as precipitation from aqueous solution with protein precipitants such as acetone or ammonium sulphate, dialysis etc. The enzyme complex may for example be precipitated on to kaolin by the addition of 20% (w./v.) or more ammonium sulphate to the culture broth.

The relatively impure enzyme system obtained by the method according to the invention may be in the form of a dry, free flowing pale cream powder which is stable for months at 4° C. The substance dissolves in water at the 0.1% level to give an opalescent solution.

As stated above the novel enzyme complex according to the invention has inter alia protease, laminarinase and chitinase action. The enzyme complex also possesses keratinase, elastase and lipase activity as well as an ability to lyse the mycelia of various fungal organisms.

The action of the enzyme complex may for example be demonstrated by its ability to lyse gelatin, casein, its effect on keratins and its lytic action against various fungal mycelia, e.g. of moulds of the genus Penicillium and the genus Cephalosporium. Its particularly rapid action is especially noteworthy.

The enzyme complex is thus useful for a variety of purposes for which proteolytic enzymes are used including, for example, the following applications:

Baking
Production of cereal foods
Meat tenderising
Chill-proofing in brewing
Production of animal feeds
Production of protein hydrolysates
Bating and unharing of hides
Stain removal in dry cleaning
Desizing of textiles
Medical uses, including wound debridgement and the relief of inflammation and blood clots and bruises.

The enzyme complex has in addition been demonstrated to have a lytic action against various pathogenic fungi, for example *M. canis, Trichophyton rubrum* and *T. sulphureum*.

The ability to lyse fungal mycelium also renders the L1 enzyme complex useful in the disposal of waste mycelium from antibiotic production especially cephalosporin products. For example such waste mycelium may be degraded with the enzyme and the soluble material so produced used as nutrient in further fermentations. The extent to which the enzyme complex acts on fungal mycelia depends on the species of mycelium concerned. For example in the case of Cephalosporium species and the three dermatophyte species referred to above, complete lysis of the cell takes place. In other cases however, e.g. the *Penicillium chrysogenum, Aspergillus fumigatus* and *Rhizopus nigricans* a pronounced effect is noted, in that the young hyphae quickly become semitransparent, the cell-contents disappear or become plasmolysed. Although a little N-acetylglucosamine is released, the cell walls remain substantially unchanged.

The keratinase action of the L1 enzyme complex is marked, the enzyme appearing to act on hair and the stratum corneum.

The L1 enzyme complex may be used in a manner customary in enzyme technology. In the lysis of fungal mycelium the enzyme appears to have an optimum pH and temperature of operation of the order of pH 7 and 37° C. respectively. For proteolytic action the optimum pH and temperature is about pH 8 and 37° C. respectively. The enzyme complex is non-inductive. The lytic activity against fungal mycelia is rapidly lost at 50° C. and above; the proteolytic activity at 60° C. and above.

For the better understanding of the invention the following examples are given by way of illustration only:

EXAMPLE 1

Conical flasks (250 ml.) containing 40 ml. of the following medium:

| | Percent |
|---|---|
| Maltose | 4.0 |
| Malt extract | 2.4 |
| Peptone | 1.0 |
| Distilled water to | 100 |

(Adjusted to pH 7 with sodium hydroxide.)

were inoculated with a loopful of a culture of the micro-organism Cytophaga NCIB 9497 and incubated at 26° C. on a shaker (5 cm. throw) operating at 200 r.p.m. After two day's incubation the culture showed strong lytic activity against Cephalosporium acremonium (Brotzu) IMI 49137.

EXAMPLE 2

Conical flasks (250 ml.) containing 100 ml. of the following medium:

| | Percent |
|---|---|
| Meat extract | 1.0 |
| Peptone | 1.0 |
| Sodium chloride | 0.5 |

(Adjusted to pH 8 with sodium hydroxide, boiled for one hour, filtered, reading to pH 7.2 with hydrochloric acid.)

were inoculated with a loopful of a culture of the micro-organism Cytophaga NCIB 9497 and incubated at 26° C. on a shaker (5 cm. throw) operating at 200 r.p.m. After one day's incubation the culture showed strong lytic activity against *C. acremonium*.

EXAMPLE 3

With the same conditions as in Example 2 but using the following medium:

| | Percent |
|---|---|
| Cornsteep liquor | 2.5 |
| Ammonium acetate | 0.55 |
| Sucrose | 2.5 |

(Adjusted to pH 6.5 with sodium hydroxide.)

after one day's incubation the culture showed lytic activity against *C. acremonium*.

EXAMPLE 4

3 litres of the following medium (sterilized from 30 minutes at 120° C.)

| | Percent |
|---|---|
| *C. acremonium* damp pressed mycelium | 6.0 |
| Dipotassium hydrogen phosphate | 0.07 |
| Potassium dihydrogen phosphate | 0.03 |
| Magnesium sulphate ($7H_2O$) | 0.05 |
| Ferrous sulphate ($7H_2O$) | 0.001 |
| Zinc sulphate ($7H_2O$) | 0.0001 |
| Glucose (sterilized separately) | 0.25 | were inoculated with 60 ml. of a well grown culture of the micro-organism Cytophaga NCIB 9497. The fermenter was maintained at 26° C., stirred at 550 r.p.m. and aerated with 3 litres of air per minute for 20 hours, with 1 litre per minute for the next 4 hours and 0.5 litre for the next two hours.

The culture was clarified by centrifugation and the supernatant fluid lyophilized to give 6.6 g. of a cream coloured solid which possessed lytic activity against *C. acremonium* and proteolytic activity aaginst casein.

EXAMPLE 5

1.5 litres of culture fluid grown as in Example 4 were freed from solid by centrifugation, adjusted to pH 6.1 with acetic acid and then concentrated under vacuum below 40° C. to 250 ml. The concentrate was added slowly to 2 litres of acetone, cooled to 5° C. with vigorous stirring. The product which was light brown in colour weighed 7.4 g. after washing with acetone and drying over phosphorus pentoxide. The product was highly active and appeared to contain all the activity of the original broth.

EXAMPLE 6

One litre of culture fluid grown as in Example 4 was freed from solid by centrifugation and to it were added 472 g. of ammonium sulphate. The mixture was stirred until the ammonium sulphate was dissolved and then the product which was precipitated was filtered off and dried, yielding 19 g. of material which appeared to contain approximately 50% of the activity of the original broth.

EXAMPLE 7

Two litres of culture fluid grown as in Example 4, were freed from solid by centrifugation and then poured slowly with stirring into 20 litres of ice-cold acetone. The product was filtered off, washed with acetone and dried over phosphorus pentoxide it weighed 10 g. and appeared to contain all the activity of the original broth.

EXAMPLE 8

Pieces of fresh calf hide were immersed in a 1% solution of the enzyme preparation (prepared as in Example 7) in M/50 Tris-buffer at pH 7. After 18 hours at 37° C. the hair came away easily with gentle scraping. Similar treatment in Tris-buffer without the enzyme preparation left the hair intact so it could not be dislodged even by vigorous pulling.

EXAMPLE 9

Mycelium of *Trichophyton rubrum* (one of the fungi responsible for athlete's foot) was produced by cultivation in a shake-flask for 24 hours at 26° C. in peptone-malt extract medium. The mycelium was filtered off and suspended at a level of 0.2% in a 0.2% solution of the enzyme preparation (prepared as in Example 7) in M/50 Tris-buffer at pH 7. After three hours' standing at 27° C. the mycelium had completely dissolved.

EXAMPLE 10

*Adsorption of L1 enzyme on kaolin*

To 600 ml. of fermentation broth produced as in Example 4, 1.65 g. of kaolin were added, followed by 180 g. ammonium sulphate, added in portions, with mechanical stirring until dissolved. The kaolin-protein mixture was separated by filtration, washed with water and then dried at room-temperature in a vacuum oven. The product, weight 11.7 g. contained all the activity of the original broth.

EXAMPLE 11

*Enzyme lysis of penicillin "felt"*

200 g. of damp mycelium from a commercial penicillin fermentation, taken from the filter at harvest, were mixed with 100 ml. of water and 1 g. of L1 enzyme added. The mixture was maintained with occasional stirring at 37° C. for four hours and then allowed to stand at room temperature for a further twenty hours.

A nitrogen determination was carried out on the digest and then a penicillin medium prepared in which the digest was used to replace the cornsteep liquor at the same (0.39%) nitrogen level.

Shake-flask penicillin fermentations were conducted on this medium, achieving an average titre of 3975 u./ml. after three days and 7590 u./ml. after five days. (A "control" fermentation conducted at the same time with the same medium except that the nitrogen source was cornsteep liquor gave an average titre of 2785 u./ml. after three days and 7795 u./ml. after five days.)

I claim:
1. A method of producing an enzyme complex which comprises culturing the micro-organism Cytophaga NCIB 9497 in the presence of a nutrient medium therefor under aerobic conditions.
2. A method as claimed in claim 1 in which the enzyme complex is recovered from the crude culture.
3. A method as claimed in claim 1 in which the nutrient medium contains fungal mycelium as source of nitrogen.
4. A method as claimed in claim 3 in which the fungal mycelium are selected from the genera Cephalosporium and Penicillium.
5. A method as claimed in claim 1 in which the nutrient medium contains at least one nutrient selected from the group consisting of malt extract, meat extract, peptone and cornsteep liquor as source of nitrogen.
6. A method as claimed in claim 1 in which the nutrient medium comprises meat extract, peptone and sodium chloride.
7. A method as claimed in claim 1 in which the nutrient medium contains added carbohydrate.
8. A method as claimed in claim 7 in which the carbohyrate is selected from the group consisting of sucrose, maltose and glucose.
9. A method as claimed in claim 1 in which the culture is effected at a temperature of from 20 to 35° C.
10. A method as claimed in claim 9 in which the culture is effected at a temperature of from 22 to 32° C.
11. A method as claimed in claim 9 in which the culture is effected at a temperature of about 26° C.
12. A method as claimed in claim 1 in which the culture time is from 20 to 50 hours.
13. A method as claimed in claim 1 in which the enzyme complex is recovered from the crude product of the culture by a process comprising drying the crude product of the culture.
14. A method as claimed in claim 1 in which the enzyme complex is recovered from the crude product of the culture by a process comprising centrifugation of the crude product of the culture.
15. A method as claimed in claim 14 in which the centrifugation is followed by freeze-drying.
16. A method as claimed in claim 1 in which the enzyme complex obtained is purified by a process comprising precipitation from aqueous solution with a protein precipitant.
17. A method as claimed in claim 16 in which the protein precipitant is selected from the group consisting of acetone and ammonium sulphate.

No references cited.

A. LOUIS MONACELL, *Primary Examiner.*

L. M. SHAPIRO, *Assistant Examiner.*